US006795515B1

United States Patent
Riedle et al.

(10) Patent No.: US 6,795,515 B1
(45) Date of Patent: Sep. 21, 2004

(54) METHOD AND APPARATUS FOR LOCATING SAMPLING POINTS IN A SYNCHRONOUS DATA STREAM

(75) Inventors: Christopher G. Riedle, Apex, NC (US); Jean-Claude Abbiate, La Gaude (FR); Alain Richard Blanc, Tourrettes sur Loop (FR); Daniel Wind, Drap (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/547,919

(22) Filed: Apr. 11, 2000

(51) Int. Cl.$^7$ ............................................ H03K 19/096
(52) U.S. Cl. .................... 375/355; 375/371; 375/354; 326/38
(58) Field of Search ................................ 375/355, 371, 375/354; 326/28

(56) References Cited

U.S. PATENT DOCUMENTS

| | | | |
|---|---|---|---|
| 4,800,564 A | 1/1989 | DeFazio et al. | 371/61 |
| 5,081,654 A | 1/1992 | Stephenson, Jr. et al. | 375/106 |
| 5,157,530 A | 10/1992 | Loeb et al. | 359/124 |
| 5,400,370 A | 3/1995 | Guo | 375/118 |
| 5,533,072 A | 7/1996 | Georgiou et al. | 375/371 |
| 5,568,302 A | 10/1996 | Puzey | 359/157 |
| 5,587,709 A | 12/1996 | Jeong | 341/100 |
| 5,651,033 A | 7/1997 | Gregg et al. | 375/354 |
| 5,675,584 A | 10/1997 | Jeong | 370/284 |
| 5,675,617 A | 10/1997 | Quirk et al. | 375/365 |
| 5,714,904 A | 2/1998 | Jeong | 327/407 |
| 6,430,242 B1 * | 8/2002 | Buchanan et al. | 375/371 |

* cited by examiner

Primary Examiner—Stephen Chin
Assistant Examiner—Edith Chang
(74) Attorney, Agent, or Firm—Connolly Bove Lodge & Hutz LLP

(57) ABSTRACT

An apparatus and process for updating a sample time in a serial link which converts serial data in parallel data. A delay line stores multiple samples of at least two data bits received over the serial link. The contents of the delay line are matched so that they can be analyzed by a processor to determine an optimum sampling position in the delay line. The processor is programmed to analyze contents of the latch by creating a sample mask from a plurality of delay line samples. The sample mask identifies transition edges of first and second data bits within the delay line. The transition edges are validated with respect to the presence, for first and second initial sampling positions for the respective data bits. New sampling positions are determined from the validated edges, and the initial sampling positions are updated with sampling positions which have been determined from the new sampling positions. In this way phase jitter induced by environmental concerns is minimized using new sampling positions along the delay line for coding the data into parallel data.

22 Claims, 9 Drawing Sheets

Example Optimal Sample Point Selection

Note: The values are shifted right one position to offset the shift left which occurred during the XOR operation.

Initialization Sample Mask Processing

FIG. 7

```
               00000000001111111111222222222233333333
Bit Position   01234567890123456789012345678901234567 8
Serial Data Stream  0001111111111111110000000000000000011111111111111000
                        Sample Window
```

| Bit Number | | | | | Counter (00 is right justified) | | | | | | | |
|---|---|---|---|---|---|---|---|---|---|---|---|---|
| 12 | 11 | 10 | 09 | 08 | 07 | 06 | 05 | 04 | 03 | 02 | 01 | 00 |
| midbit1 (MSB = 12) | | | | | midbit1 Integration Counter (MSB = 07) | | | | | | | |

| Bit Number | | | | | | Counter (00 is right justified) | | | | | | | |
|---|---|---|---|---|---|---|---|---|---|---|---|---|---|
| 13 | 12 | 11 | 10 | 09 | 08 | 07 | 06 | 05 | 04 | 03 | 02 | 01 | 00 |
| midbit2 (MSB = 13) | | | | | | midbit2 Integration Counter (MSB = 07) | | | | | | | |

88

METHOD AND APPARATUS FOR LOCATING SAMPLING POINTS IN A SYNCHRONOUS DATA STREAM

RELATED APPLICATION

This application is related to the subject matter of U.S. patent application Ser. No. 09/330,713, filed Jun. 11, 1999.

BACKGROUND OF THE INVENTION

The present invention relates to a Data Aligned Synchronous Link (DASL) interface for providing a high speed point-to-point serial data communication link. Specifically, a DASL interface is provided having a receiver which deserializes the received data in a manner which avoids inaccuracies due to phase jitter.

DASL links are utilized for providing high speed point-to-point interchange communication between CMOS ASIC modules. As most CMOS ASIC devices have an internal parallel data bus structure, it has been found advantageous to serialize the parallel data when transmitting the data from chip to chip to reduce the pin out requirement for the chips. Serial communication between the chips requires an interface to receive the data and deserialize the data into a parallel data format. In order to convert the serial format data into parallel format data, each of the received serial data bits is oversampled. The process of sampling each data bit requires a sampling time which is accurately linked to the synchronous data received so that an accurate assessment of the value of the data bit can be made.

In order to facilitate the accurate location of the sampling time, the apparatus and method described in the aforementioned related application provide for a training pattern to be sent between connected chips or modules so that the receiving module can develop bit synchronization with the incoming training pattern. Once the synchronization has been realized, it is then possible to begin transferring data between connected chips or modules and convert the data to a parallel format using the previously established sampling point.

The received serial data is, however subject to the effects of jitter, wherein data transmission edges appear to change with time. Sampling of the serial data signal must be done in a way which avoids any false detections due to the jitter of data transitions within the serial bit stream. The data transitions may change over time due to changes in operating conditions such as temperature, and the sampling points for sampling the serialized data must move to a new sample time position to avoid the consequences of environmentally induced jitter. Accordingly, the interface must perform a bit alignment so that sampling occurs essentially in the middle of a data bit rather than near its edges so that a reliable determination of the value of each data bit may be made. Resetting the sample time during the data mode operation must be done using received data which may have any random bit pattern requiring a different process for reestablishing the sampling time.

SUMMARY OF THE INVENTION

The present invention is directed to a process which determines an optimum sampling time for sampling bits of a serial data stream. During a data mode operation multiple samples of the data bits contained in the serial bit stream are received by a delay line where they are oversampled. Similar to the sampling point evaluation which took place during the training procedure, a bit edge mask is obtained for each of the sample data sequences by combining adjacent samples of the data stream in a logical operation which identifies within the samples of the received data bits the location of a data transition or change. Once all of the transition edges are located, sample times can be selected which lie between the transition edges on an accurate basis.

A number of sets of requests are made by the interface receiver to collect multiple samples of the data and create the bit edge masks for the samples of data which are used to create a delay line sample mask. Data transition edges are located and analyzed with respect to their location to the current sample point which was selected during the training procedure.

The system locates first and second edges of first and second consecutive bits currently being sampled in a delay line. Once the foregoing edges are located within the delay line, the current sample points, corresponding to a sample time for the receive interface, are evaluated by comparing their location with respect to the edges. A new optimal sample point for each of the bits can be recalculated, based on the positions of the newly located bit transition edges. In a preferred embodiment of the invention, the new optimal sampling points are integrated with respect to previously calculated sample points determined in response to earlier requests made by the receiver. When the integrated value exceeds a threshold value, the sampling points are reset to a new value which identifies a new sampling time for the receiver. Using the average of the new sample point locations further reduces the possibility of a sampling error due to phase jitter.

DESCRIPTION OF THE DRAWINGS

FIG. 7 illustrates a sample of the delay line which omits edges from two data bits within the sample;

FIG. 9 shows an integrated output from the counter for the first sampled bit; and FIG. 10 shows the integrated counter output for the second bit.

DESCRIPTION OF THE PREFERRED EMBODIMENT

Figure 1:
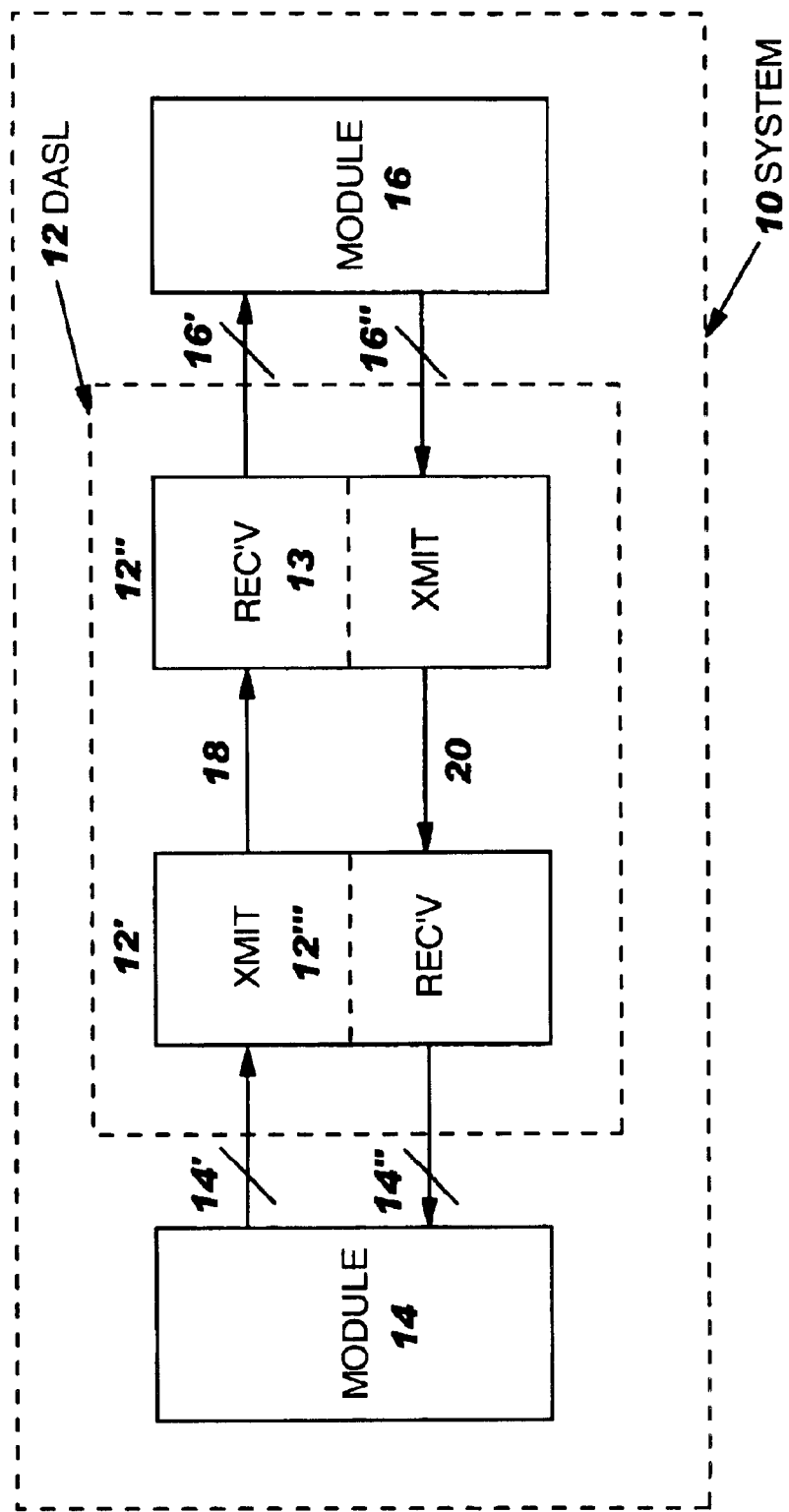
FIG. 1 is a block diagram of a DASL12 link for communicating serial data between modules of an electronic system 10.

FIG. 1 is a block diagram which illustrates the connection of a DASL12 with respect to two modules 14 and 16 which are typically implemented in CMOS ASIC designs, and rely on a serial data transmission between modules. While data may be handled within a module on a parallel basis, in order to efficiently transfer data between modules, and conserve the pin out for a module, serial data transmission between modules is preferred.

Figure 2:
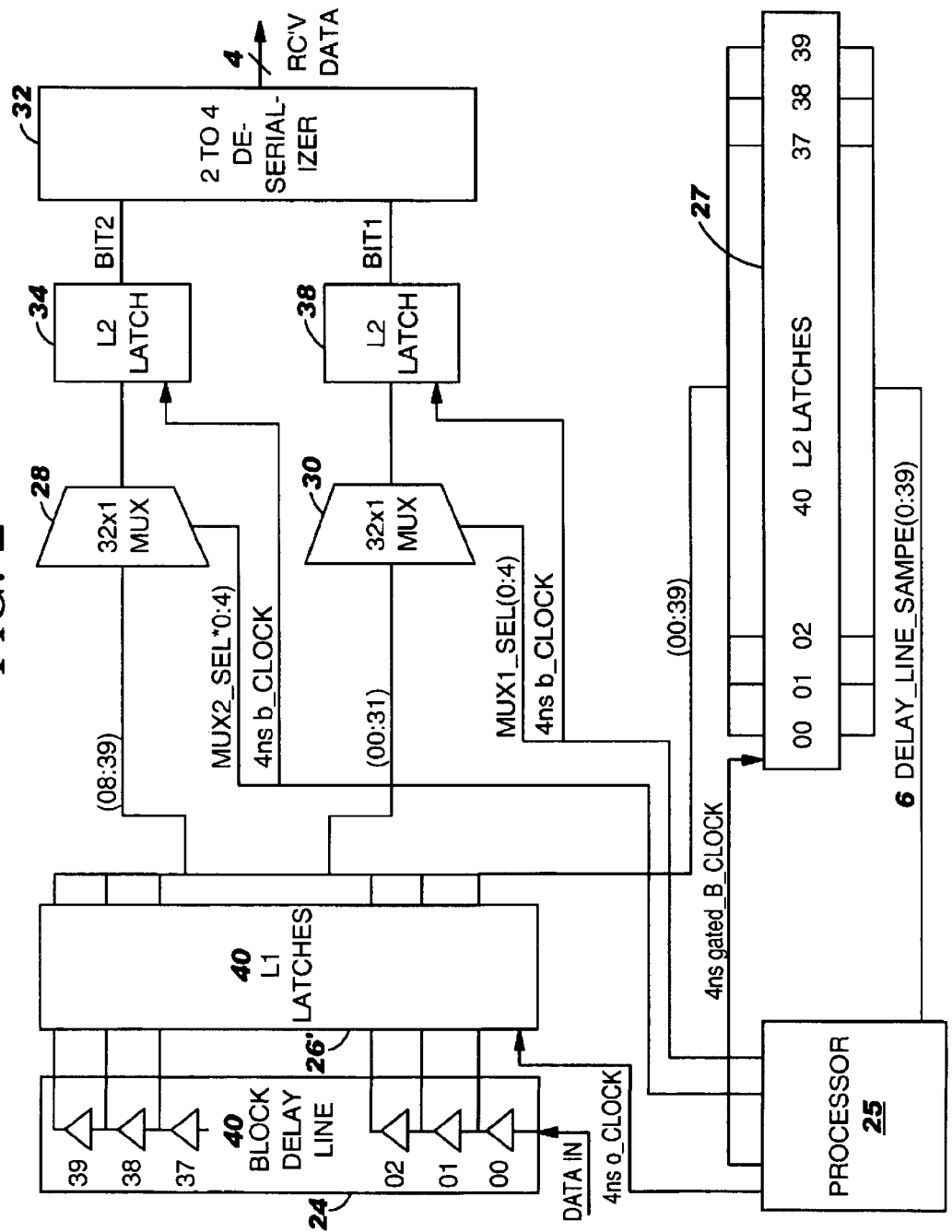
FIG. 2 is a block diagram illustrating the circuitry for converting serial data received by the DASL12 receivers into parallel data for use by a module.
Figure 3:
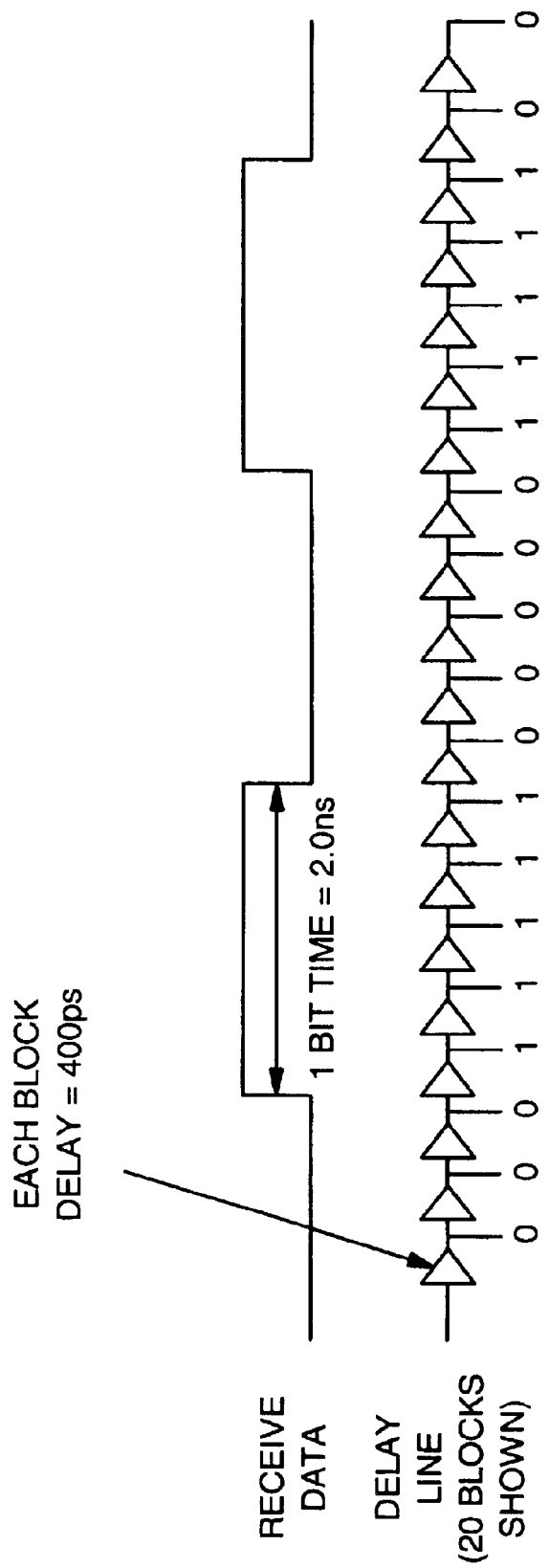
FIG. 3 illustrates the sampling of multiple bits of a serial data stream in the delay line.

The receive portion of the DASL 12 interface 13 includes a serial-to-parallel conversion circuit illustrated in FIG. 2. Data from the transmit portion of a DASL 12b is stored in a 40-block delay line 24 of module 16 where it is to be oversampled. Each of the outputs of the delay line are sample positions having a unique time position with respect to the stored data. In a preferred embodiment of the invention, the delay line has a block delay which varies between 133 ps to 400 ps depending on environmental conditions such as temperature and voltage changes. Assuming a data rate of 500 mHz, a forty block delay line with each block having 400 ps of delay will store eight complete data bits and providing a minimum of 5 sample positions per bit. The delay line 24 holds at least a minimum of 2.5 bits, and a maximum of 8 bits. FIG. 3 illustrates the outputs of the delay line 24, which provide for an oversampled data stream. Using the forty block delay line (twenty of which are shown in FIG. 3), five samples of each of the two bits are available at the outputs of the block delay line 24.

Accurately decoding the serial data in order to convert the serial data to parallel data requires that the data be accurately sampled. As the data is subject to phase jitter, wherein leading and trailing edges of each bit appear to change due to temperature, voltage and other environmental considerations, it is necessary to select a sample position on the delay line which is least susceptible to false decoding due to the effects of jitter which is usually the midpoint of the data bit, equally distant from the leading and trailing data bit transitions. Not only must the sample points be set during a training phase, wherein each receiver is synchronized from a known data stream transmitted to each receive portion 13 of modules which communicate with one another, but the sample positions must be updated during a data reception mode as the position of each data bit within the block delay line will change over time. The embodiment set forth in FIG. 2 provides for maintaining accurate sampling of the serial data stream which was previously set in the initialization period, during a subsequent data mode operation.

of outputs 8 to 39 from latch 26 is selected by the mux 28, and one of the outputs 00 to 31 is selected by mux 30, representing sample position of first and second bits stored in latches 26. Latches 27 store in response to the processor command the contents of latches 26 so that the appropriate sample position may be selected based on the data stored in latches 26.

Improved Initialization During Training

As set forth in the previous corresponding co-pending application hereby incorporated by reference, during a training procedure, sample positions are determined based on initialization bits received in block delay line 24 and latched in latches 26.

As a departure from the method used in the corresponding co-pending application for determining the initial sample positions, midbit 1 value and midbit 2 value, the present invention contemplates certain changes to the training procedure set forth in the corresponding co-pending application. Instead of a single bit edge mask, which identifies transitions of the training pattern stored in the delay line 24, a series of delay samples are taken which are substantially asynchronous. The training pattern received in the delay line 24 contains missing transitions, and asynchronous samples are needed to insure that all edges to data bits in the delay line are represented. Table 1 shows the multiple delay line samples and multiple bit edge masks created from the delay line samples. As set forth in the foregoing application, an XOR operation on adjacent bits creates a bit edge mask which indicates the bit edge locations. Multiple bit edge masks can be ORed together to create an accumulated bit edge mask, referred to as the delay line sample mask. Table 1 shows the delay line sample masks using the training pattern of alternate 1s in 0.

TABLE 1

Delay Line Sample Mask

| Sample # | Delay Line Sample Bit Edge Mask | Delay Line Sample Mask |
|---|---|---|
| 1 | 000111110000011111100000111110000011110000100001000010000100001000010000100001000010 | 001000010000100001000010000100001000010 |
| 2 | 000111111111100000111110000000000111100000100000000010000100001000000001000010 | 001000010000100001000010000100001000010 |
| 3 | 00111110000011111000001111100000111110000100001000010000100001000010000100001000010000100 | 011000110001100011000110001100011000110 |
| 4 | 0011111000001111100000111110000011111000010000100001000010000100001000010000100 | 011000110001100011000110001100011000110 |

The outputs of the block delay line 40, representing sample positions for the stored data are applied to the input of latches 26 and 27, which are latched in response to a request from processor 25. At appropriate sample times, 32×1mux 28 and a 32×1mux 30 are selected so that a sample value from sample positions representing each of the two bits is clocked to latches 34 and 38. The system uses a 2:4 deserializer 32 which provides a 4-bit nibbled output which is stored in a data buffer in a parallel format.

The selection of the appropriate sample times for the mux 28 and mux 30 are provided by processor 25 under control of an algorithm executed in processor 25. Each of these sample times corresponds to an optimum sample position in delay line 24 for sampling the two bits of data stored in block delay line 24 which have been transferred to latches 26, 29. One Once the delay line sample mask has been generated, it can be analyzed to determine where edges of adjacent bits exist, and from the edges an optimal sample point for each of two adjacent bits may be determined.

In examining the delay line sample mask of Table 1, the following rules may be observed concerning edges:

1. Transition edges of a bit must be separated by at least three delay line positions;

2. Sample points must be centered between edge transitions; and

3. The sample points are located along the delay line such that the sample point for the second bit is located at a delay line position greater than 19.

By prepositioning data within the delay line, so that the second bit has a position greater than 19, permits re-establishing of a sample position in either an increasing in time or decreasing in time position within the delay line during a subsequent resetting of the sample positions.

Figure 4:
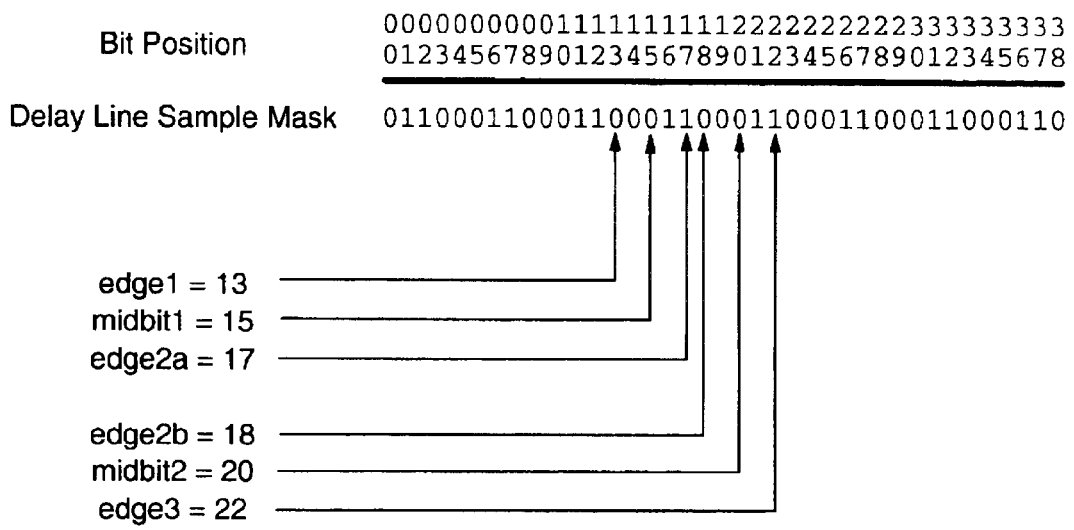
FIG. 4 shows the location of data transition edges from the delay line sample mask.

FIG. 4 illustrates the process of locating the edges and mid-bit values from the delay line sample mask of Table 1. Three edges delineating two complete bits must be present in a delay line, however, because of the positioning of the data in the delay line, three edges may not be visible. When this condition is observed, a virtual edge is located in the sample mask in location 0, and at location 39. In this way, three edges will be combined for use by the algorithm. The delay line sample mask is shifted right by one position to offset a left shift which occurred during the XOR operation.

Once the edges are located, sample points may then be computed in accordance with the following equations:

midbit1=edge 1+0.5(edge2*a*−edge1)                    (EQ1)

midbit2=edge2*b*+0.5(edge3−edge2*b*)                  (EQ2)

Before entering the data mode operation, the training procedure includes a routine for locating the sample position at substantially the midpoints of the delay line, and away from the edges where it will be difficult to relocate the midpoints during a data mode operation.

Figure 5:
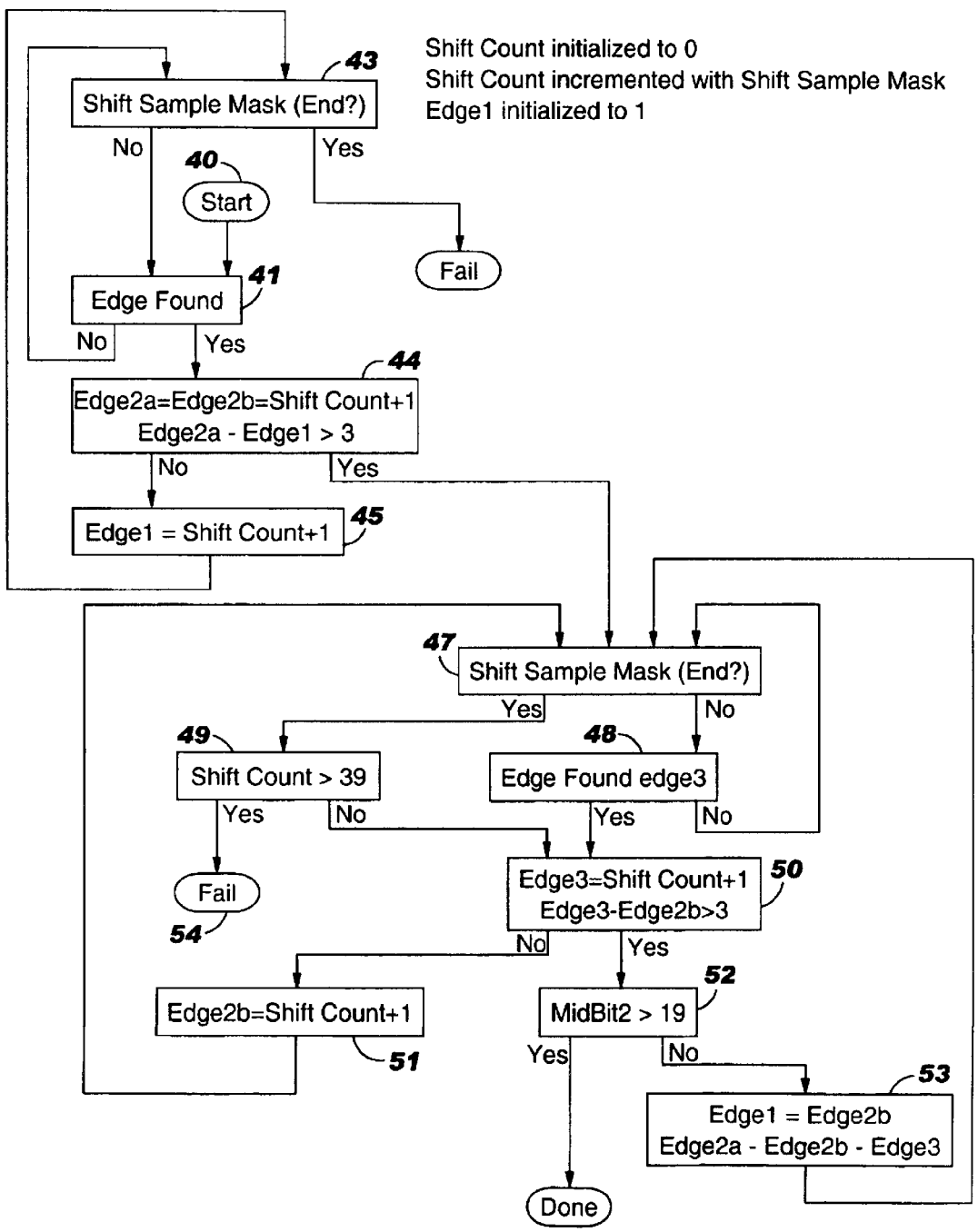
FIG. 5 shows the detailed steps for locating the sample position mid value 1 and mid value 2.

The initialization sample mask processing in accordance with the foregoing algorithm is shown more particularly in FIG. 5. The start 40 of the process of FIG. 5 begins by looking in the first position of the sample mask for an edge in step 41. When an edge is not found, the sample mask is shifted in step 43 until such time as an edge is located. If the located edge is less than three positions from a previously-located edge, the edge is set as the first edge. If the edge is found greater than three positions from the previously-found edge, the edge is edge 2*a* which is coincident with edge 2*b*.

Once edges 1 and 2*a* and 2*b* are located in accordance with the foregoing, the remaining sample mask positions are examined in step 47 until edge 3 is found in step 48. If the edge 3 is not found within 39 shift counts, i.e., the full width of the shift sample mask, the sample is deemed to fail in step 54.

Once the edge 3 is found, and is verified in step 50 as being greater than three positions from edge 2, a midbit 2 value is calculated in accordance with Equation 2 in step 52. If the midbit value 2 is greater than 19, processing stops and the values of midbit 2 and midbit 1 are used as the initial sample positions before entering the data mode. In the event edge 3 has been found, and midbit 2 is less than the middle position (19) for the delay line, edge 1 is set equal to edge 2*b*, edge 2*a* is set equal to edge 2*b*, edge 3 is continued to be searched for in steps 48–50.

By locating the sample positions at substantially the middle of the delay line, any further adjustments to the midbit 1 and midbit 2 sample position values may be done during the data mode operation in either direction within the delay line 24.

Finally, the sample times for multiplexers 28 and 30 may be computed from the midbit values. The select values for selecting a position on the delay line for these multiplexers is set, so that the multiplexer 30 is set to a point equal to midbit 1 value, and the select values for multiplexer 28 is set to midbit 2 value minus eight positions, recognizing that multiplexer 28 is connected to position 8–39 of the delay line. This may be represented as:

mux30_sel=midbit 1                                    (EQ 3)

mux28_sel=midbit2−8                                   (EQ 4).

DATA MODE OPERATION

During the data mode transmission following the training procedure, changes to the initial sample time must be effected in order to compensate for environmental conditions which are likely to shift the location of the data in the block delay line 24. As the position of each of the two data bits in delay line 24 move, sampling of the data bits occurs at or near the edges of the data bits which are more susceptible to the effects of jitter. Accordingly, during the data reception mode, changes in the selected sampling positions provided by block delay line 40 will be made to be certain that sampling occurs at a position substantially midway between edges of the data bit.

The algorithm implemented in firmware within processor 25 periodically issues a 4 nanosecond gated clock command during a data reception mode operation to latch the contents of delay line 24 in latches 27, capturing a delay line sample to be used by the firmware of processor 25 to calculate a new set of sample positions for the first and second bits stored in the delay line 40. When multiple links are provided between multiple pairs of serially connected modules, the processor 25 may issue a gated clock command to all links on a round robin basis. The sampled data in latches 27 is used to create a delay line sample mask as shown in Table 1. Referring now to Table 1, four of ten samples of the delay line are shown. A bit edge mask is created for each of the delay line samples. In sample number 1, the data appearing between sample positions 00 and 39 of delay line 24 is used to form a delay line sample mask. By taking the XOR function of adjacent bits in the sample, the result is thirty-nine bits of data constituting the bit edge mask which identifies edges of the bits of data appearing in delay line 24. Like numbered bits of the masks are ORed together for the ten edge masks. The result is an accumulated bit edge mask which serves as the delay line sample mask.

Once the delay line sample mask is created for the selected ten consecutive delay line samples, the firmware in processor 25 analyzes the delay line sample mask to locate the position of the four edges of the sampled data bits.

TABLE 2

Delay Line Sample Mask

| Sample # | Delay Line Sample Bit Edge Mask | Delay Line Sample Mask |
|---|---|---|
| 1 | 0001111100000111110000011111000001111100 0010000100001000010000100001000010000010 | 0010000100001000010000100001000010000010 |
| 2 | 0001111111111000001111100000000001111100 0010000000001000010000100000000001000010 | 0010000100001000010000100001000010000010 |

TABLE 2-continued

Delay Line Sample Mask

| Sample # | Delay Line Sample Bit Edge Mask | Delay Line Sample Mask |
|---|---|---|
| 3 | 00111110000011111000001111110000011111000 01000010000100001000010000100001000010000100 | 01100011000110001100011000110001100011000110 |
| 4 | 00111110000011111000001111110000011111000 01000010000100001000010000100001000010000100 | 01100011000110001100011000110001100011000110 |

Figure 6:
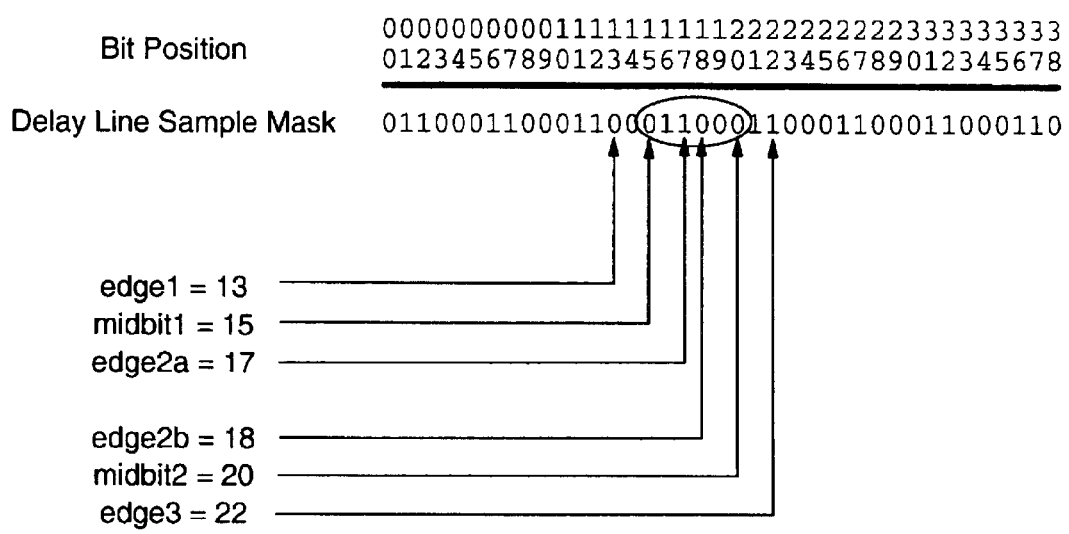
FIG. 6 shows the relationship between the delay line sample mask and bit positions of the delay line.

FIG. 6 illustrates the location of the edge positions within the delay line for the determined delay line sample. The delay line sample mask is shifted one bit to the right in order to offset the loss of the corresponding shift left which occurs during the XOR operation generating the bit edge mask. During the data reception mode, the data being sent to the receiving portion 13 of the DASL 12 is unknown as distinguished from the data which was received during the training process, and data edges separating data bits may not be present.

The algorithm within the firmware of processor 25 will first look for the first edge of the second, later arriving, data bit within the delay line. This edge, edge 1, is the last edge found before the current sample position midbit 1 for the later arriving bit, identified as bit 1. The first edge found after the current sample position (obtained during the training period) is edge 2a. The second, earlier arriving bit, bit 2, is analyzed in the same way. The last edge found in the delay line before the current sample position midbit 2 for bit 2 is noted as edge 2b. The edge immediately following the sample position for bit 2 is noted as edge 3. Once the edges are located, they are validated as follows.

Edge 1, edge 2a, edge 2b and edge 3 are validated from the data by observing the following equations 1, 2, 3 and 4:

$$\text{edge}2a - \text{edge}1 > 3 \quad (EQ\ 5)$$

$$\text{edge}2a - \text{edge}1 = <1.5(\text{midbit}2 - \text{midbit}1) - 1 \quad (EQ\ 6)$$

$$\text{edge}3 - \text{edge}2b > 3 \quad (EQ\ 7)$$

$$\text{edge}3 - \text{edge}2b = <1.5(\text{midbit}2 - \text{midbit}1) - 1 \quad (EQ\ 8).$$

Equations 5 and 7 require the first and second edges of the data bits be separated by more than 3 sample positions. For the edges to be valid according to equation 5, edge 2a must exist more than three data positions from edge 1, and edge 3 must be greater than three positions from edge 2b. Further, the edges must be separated by a number of positions in the sample mask which, according to equations 6 and 8, is less than 1.5 times the difference between the first and second sampling points, minus 1 sample position. The midbit 2 and midbit 1 values are the previous sample positions determined by the algorithm, or determined during the training procedure, whichever is most recent. Accordingly, when the valid edge values are determined the current optimal sample points can be determined based on this information as follows:

$$\text{cur\_midbit1} = \text{edge}1 + 0.5(\text{edge}2a - \text{edge}1) \quad (EQ\ 9)$$

$$\text{cur\_midbit2} = \text{edge}2b + 0.5(\text{edge}3 - \text{edge}2b) \quad (EQ\ 10).$$

In the event that three edges cannot be located in the delay line, such as is shown in FIG. 7, virtual edges can be inserted at locations 0 and 39. This will insure that at least three edges are present for determining whether new sample positions are to be computed. While the virtual edges may be imprecise, the result is an acceptable calculation for the new sample points.

Figure 8:
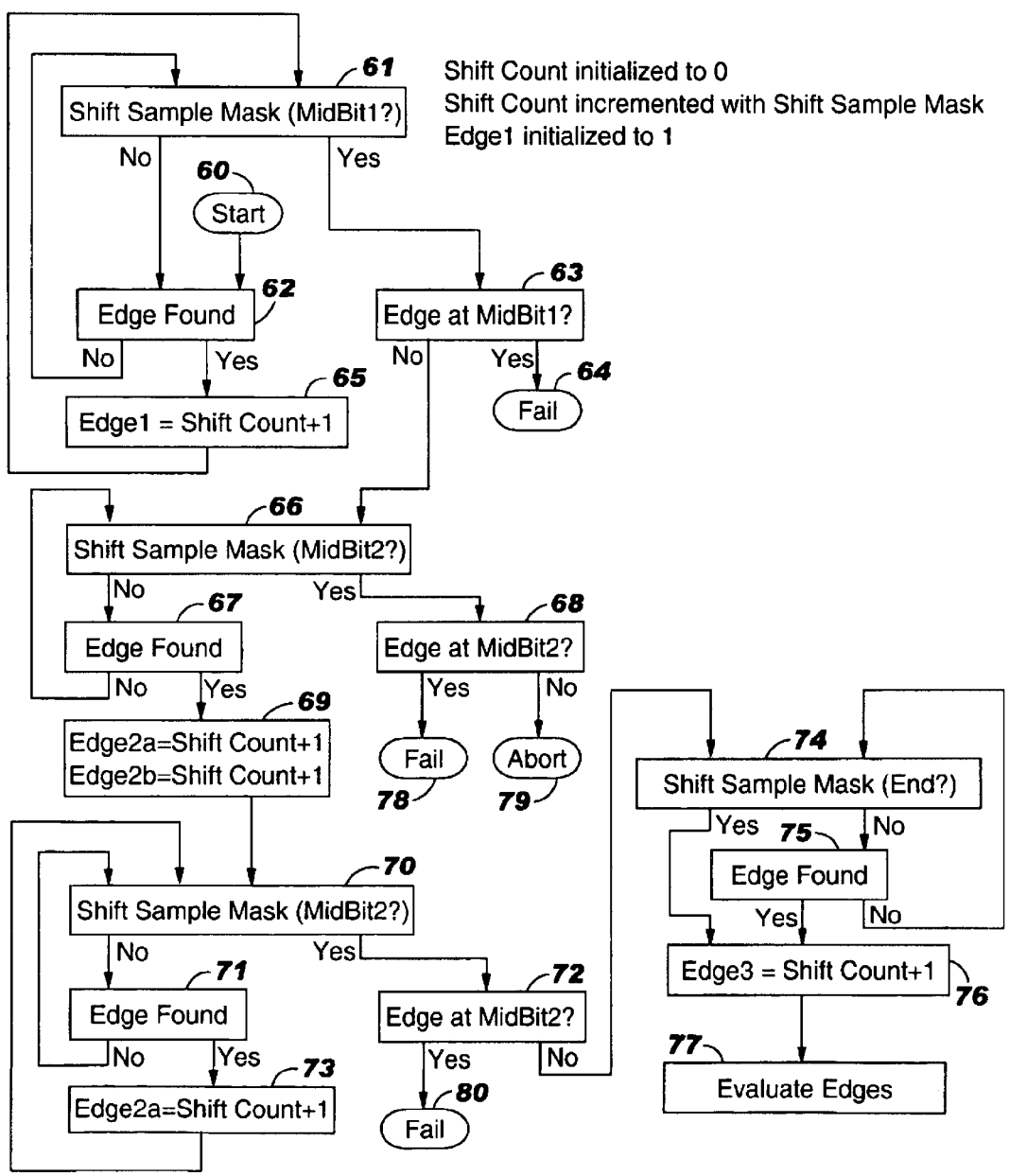
FIG. 8 illustrates the firmware used to generate the sample mask of FIG. 4.

The process carried out by processor 25 for locating the sample positions and corresponding sample time for muxs 28, 30 is shown more particularly in the flowchart of FIG. 8. The sample mask is shifted left a series of positions in order to locate edges for each data bit for the mask. The process begins at 60, and the sample mask is shifted in step 61 until a first edge is located in step 62, or until a mid point is reached. The location of edge 1 is stored in step 65, as a count of the number of times the mask has been shifted plus 1. Additionally, during the shifting of the sample mask a determination is made in step 63 as to whether or not the edge is located in the previously determined sampling position produced by mux30, midbit 1, determined during the initialization training procedure or in a previous data mode resynchronization. An indication in step 63 that an edge had been found at the location of midbit 1 indicates in step 64 that the sample is corrupted and may not be used to set a new sampling point.

Once the first edge 1 is located, the sample mask is again shifted in step 66, until the next edge is found in step 67 or the previously determined midpoint 2 is reached. Once the second edge 2a is found, edge 2b is set equal to edge 2a. A test is conducted in step 68 to determine whether or not the edges 2a, 2b are at the location for the sample position selected by mux28, midbit 2, which was determined during the initialization training sequence or in a prior data mode sample mask processing operation. Having found edges 2a, 2b, the sample mask is shifted again in step 70, and if a second edge 2b is found due to shift, the position of 2b is shifted one count as shown in step 73.

The new edge 2b is compared to the previous location for the sampling position midbit 2 in step 72. If the edge is not beyond the position of midbit 2, the shifting of the mask continues in step 74 until the edge is found in step 75 or until the end of the sample is reached. The edge 3 location is noted in step 76 as the total shift count plus 1. Having located the edges, a new midpoint may be found in accordance with equations 9 and 10 in step 77.

Prior to resetting the sampling times for muxs 28, 30, the sampling positions are integrated to filter out the effects of jitter on the newly determined sampling positions cur_midbit 1 and cur_midbit 2 using an integration counter within the firmware processor 25 as shown in FIGS. 9 and 10.

Referring now to FIGS. 9 and 10, integration counters 83 and 84 are shown for filtering each of the midbit 1 and midbit 2 values which are computed in accordance with equations 5 and 6. Counters 83 and 84 are 8-bit signed counters which are incremented or decremented depending upon whether the calculated values for midbit 1 and midbit 2 are less than or greater than the previous value for midbit 1 and midbit 2 obtained during the training procedure, or a previously set value obtained during the data mode synchronization. Each time the processor 25 issues a command to enter the sampling time resynchronization routine, the midbit 1 and midbit 2 values are determined from equations 9 and 10. For eight consecutive calculations of midbit 1 and midbit 2, the difference between the calculated value and the previously set values is used to either increment or decrement counters 83 and 84. As shown in FIG. 9, a midbit value for midbit 1 is inserted in the most significant bit positions of a register 85. In FIG. 10, the midbit 2 value is stored in the six most significant locations of register 88.

Consecutive values of recalculated midbit 1 and midbit 2 are each compared to the initial midbit 1 and midbit 2 values of registers 81 and 83. The counter 83, 84 are accordingly incremented or decremented depending upon the number of sample positions by which midbit 1 or midbit 2 differs from the most recent calculation thereof. If an error begins to build between the recalculated values of midbit 1 or midbit 2 and the initialization values of midbit 1 and midbit 2, in either an increasing or decreasing direction, counters 83 or 84 will overflow or underflow. When this event is detected, the processor 25 will adjust the sample position in corresponding sample time for muxs 28 and 30 by 1 sample position, depending on whether the counter 83 or 84 overflows from accumulating differences between midbit values in an increasing or decreasing pattern. The sampling times for muxs 28 and 30 stored in registers 85, 88 are then moved one position before or after the previous midbit 1 or midbit 2 values constituting the new reference value by which new values of midbit 1 and midbit 2 are compared.

By providing for the foregoing integration of each of the differences between newly calculated values of midbit 1 and midbit 2 samplings positions, the effect of jitter on resynchronized sampling positions is further minimized.

The foregoing description of the integration counter applies to one link which is being resynchronized by processor 25. It will be evident that the counter structure may also be used in the sampling time resynchronization for other links. The processor 25 may preferably operate at a round robin fashion, wherein the counters 83 and 84 are used to integrate midbit values form other links, which are saved, so that the counter can be used in the resynchronization of other data links services by the round robin operation. During subsequent use of the counter, the same contents can be retrieved so that the counter for that link may be correspondingly incremented or decremented in accordance with the most recently calculated value of midbit 1 and midbit 2.

Thus, jitter which may be experienced during a data load operation is effectively integrated out so that sample point changes are not inadvertently changed.

The foregoing description of the invention illustrates and describes the present invention. Additionally, the disclosure shows and describes only the preferred embodiments of the invention, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

What is claimed is:

1. An apparatus for updating a sample position for data received from a serial data link comprising:

a delay line for storing multiple samples of at least two data bits of the received data;

a latch to store a sample of said delay line contents;

a processor connected to read the contents of said latch and to analyze the contents by:

creating a sample mask from a plurality of delay line samples which identifies transition edges of first and second data bits received in said delay line;

validating said transition edges with respect to first and second initial sampling positions for respective of said data bits;

determining new sampling positions from the validated transition edges; and replacing said initial sampling positions with updated sampling positions based on said new sampling positions.

2. The apparatus according to claim 1 wherein said processor executes the step of validating said transition edges by determining that said transition edges of a respective data bit are separated by a minimum number of sample positions.

3. The apparatus according to claim 1 wherein said step of validating said transition edges comprises determining that the spacing between transition edges of each data bit is greater than the difference between said initial sampling positions.

4. The apparatus according to claim 3 wherein said step of validating said edges comprises determining that said edges of each data bit are spaced a number of sample positions greater than one and a half times the difference between said initial sampling positions, less one sampling position.

5. The apparatus according to claim 1 further comprising integrating the difference between each new sampling position of said first and second data bits and a respective initial sampling position, and replacing said initial sampling position of each bit with an updated sampling position when the integrated value exceeds a threshold value.

6. The apparatus according to claim 1 wherein said updated sampling positions are different from said initial sampling position by one sampling position.

7. The apparatus according to claim 1 wherein said processor inserts virtual transition edges in said sample mask when less than three transition edges are present in said sample mask.

8. The apparatus for sampling serial data according to claim 6 wherein said processor determines said sample mask from the sub-steps of:

determining an edge mask for each of a multiple of a plurality of samples of said delay line contents;

combining like bits of each edge mask in an OR function to derive data bits of said sample mask.

9. A process for determining a sampling point for a serial data stream comprising the steps of:

storing samples of said serial data stream in a memory;

determining a sample mask for said samples of said data stream which identifies data transitions in said serial data stream for at least two bits of said data stream;

locating first, second, third and fourth edges defining data transitions in said sample mask;

validating each of said first, second, third and fourth edges with respect to an initial sampling position of a respective bit;

and determining new sample positions of said data stream based upon said first, second, third and fourth edges.

10. The process according to claim 9 further comprising:

integrating the differences between the determined new sample positions and said initial sample positions; and comparing the integrated differences with a reference value; and updating said initial sample positions when said integrated difference exceeds a minimum difference.

11. The process according to claim 9 wherein said step for determining said sample mask comprise:

storing multiple data streams;

performing from each of adjacent samples of a data stream an XOR function whereby edges of a data transition are located in each of said data streams.

12. The process of claim 11 wherein said process for determining said sample mask further comprising:

combining in an OR function the results of the XOR function for said multiple data streams.

13. A process for updating new sampling positions for a serial data stream which is subject to data bit jitter comprising:

storing multiple samples of at least two bits of said data stream;

determining the location of transition edges of said two bits within each of said multiple samples;

determining the relative position of said bits from said transition edges in each of said multiple samples;

determining a new sampling position for each of said bits based on the relative position of said bits;

incrementing a counter each time a new sampling position has increased in position from an initial sampling position;

decrementing said counter each time said new sampling position has decreased in position from said initial sampling position; and updating the data stream sampling position from said initial sampling position when said counter contents have changed a predetermined amount.

14. The process according to claim 13 wherein said step of updating said sampling position increases the initial sampling point when said counter has increased in value by said predetermined amount, and decreases said initial sampling point when said counter has decreased in value by said predetermined amount.

15. The process according to claim 13 wherein said step of updating said sampling position increases the initial sampling point one position when said counter has increased in value by said predetermined amount, and decreases said initial sampling point by one when said counter has decreased in value by said predetermined amount.

16. The process according to claim 14 wherein said counter is incremented or decremented an amount equal to the difference between said new sampling position and said initial sampling position.

17. An apparatus for updating a sample position for data received from a serial data link comprising:

a delay line for storing multiple samples of at least two data bits of said received data;

a latch connected in parallel with said delay line to store a sample of said delay line contents;

processor connected to the latch to the latch to read the sample stored in said latch and to analyze the contents by:

locating transition edges of the first and second data bits received in said delay line;

validating said transition edges with respect to first and second initial sampling positions for respective of said data bits;

calculating first and second new sampling positions with respect to said transition edges;

determining the difference between said first and second new sampling positions and said first and second initial sampling positions;

integrating said differences; and resetting said first and second initial sampling positions to a new value when said integrated differences exceed a predetermined level.

18. The apparatus according to claim 17 wherein said first and second initial sampling positions are changed by one position when said first and second sample positions are reset.

19. An apparatus for establishing first and second sampling positions for first and second bits of a training data pattern received from a serial data link comprising:

a delay line for storing multiple samples of at least two data bits of the received training data;

a latch connected in parallel with delay line to store a sample of the delay line contents;

a processor connected to the latch to read the delay line contents and to analyze the contents by:

creating a sample mask from a plurality of delay line samples which identifies transition edges of first and second data bits received in said delay line; and determining first and second transition edges for each of the data bits received in said delay line to store a of said latch said data bits; and determining first and second sampling positions from said transition edges.

20. The apparatus according to claim 19 further comprising:

inserting virtual edges in said sample mask for said edges when said sample mask includes less than 3 transition edges.

21. The apparatus according to claim 20 wherein said virtual edges are inserted in the beginning and end of said sample mask.

22. The apparatus according to claim 19 wherein said processor further shifts said sample mask to locate one of said sampling positions at substantially the midpoint of said delay line.

* * * * *